Sept. 14, 1926.

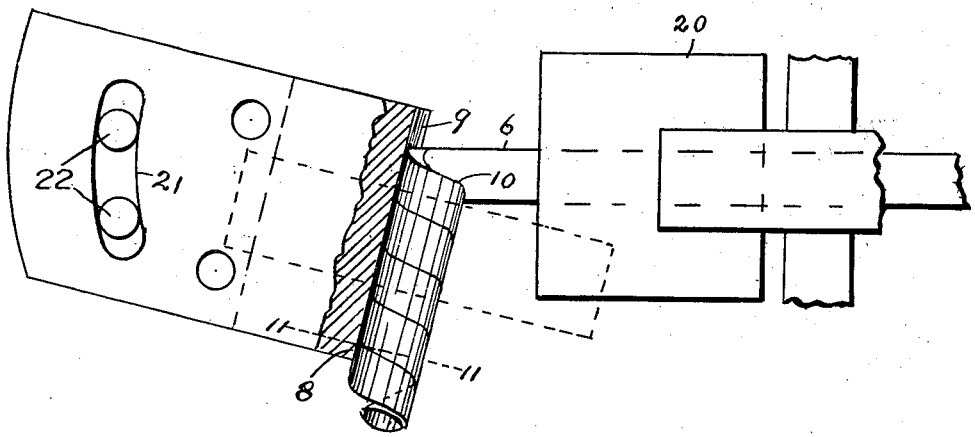
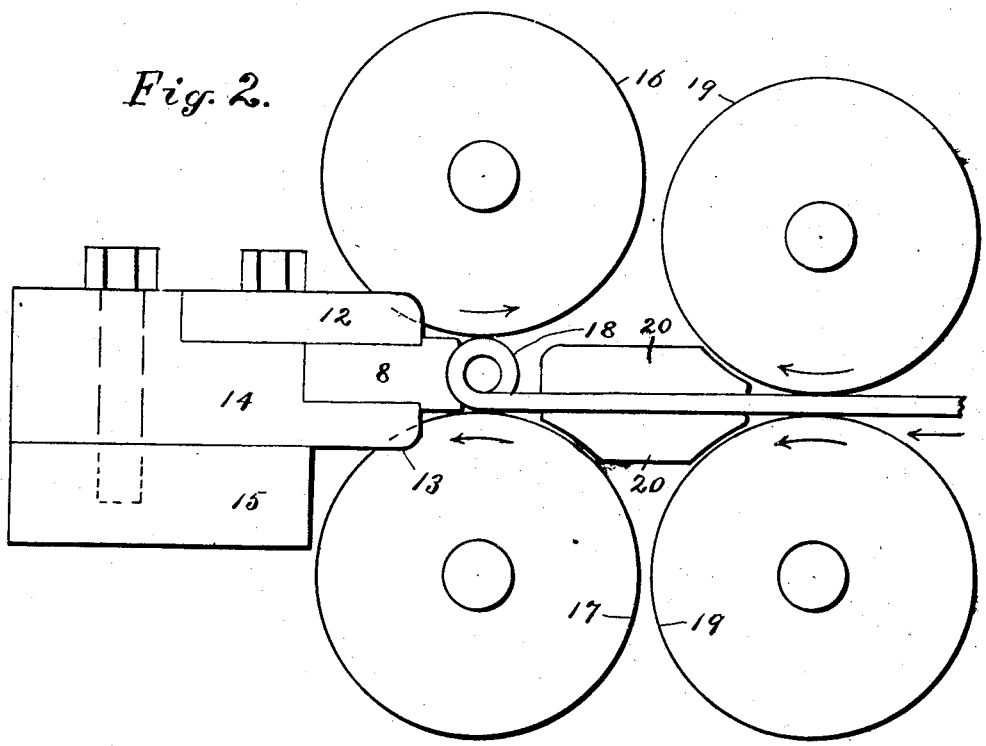

C. KNOTH 1,600,116

METHOD AND MEANS FOR MAKING SPIRALLY WOUND ROLLS

Original Filed Feb. 7, 1922   2 Sheets-Sheet 2

Patented Sept. 14, 1926.

1,600,116

UNITED STATES PATENT OFFICE.

CONRAD KNOTH, OF HILLSIDE, NEW JERSEY, ASSIGNOR, BY MESNE ASSIGNMENTS, TO GENERAL MOTORS CORPORATION, OF DETROIT, MICHIGAN, A CORPORATION OF DELAWARE.

METHOD AND MEANS FOR MAKING SPIRALLY-WOUND ROLLS.

Application filed February 7, 1922, Serial No. 534,754. Renewed March 23, 1923.

This invention relates to the making of rollers and is herein exemplified in a process and apparatus for making, from a strip of metal, hollow cylindrical rolls such as are used for bearings.

Hitherto, rolls have been made by winding a strip of metal on a mandrel, a rotating chuck holding one end of the strip and winding it round the mandrel while simultaneously pulling the strip through a fixed guide. Before starting such machines, the strip must be passed through the guide and attached to the chuck and the initial coils are imperfect thus involving considerable waste at the end of the strip. Furthermore, the length of the roll which can be made from a strip is strictly limited by the length of the machine and mandrel and when a roll of this length has been made, the strip must be cut and another started involving again the waste at the end of the strip.

An object of this invention is to provide an improved process and apparatus for making rolls from a strip of material. As an important feature, a continuous roll of any desired length can be made with practically no waste and without the use of a mandrel. To effect this result, the strip is continually forced endwise into a smooth half-die set at an angle to the strip and is caused to form automatically a continuous series of spiral convolutions by mere end thrust into the die. To facilitate the perfect formation of the initial coils and thus avoid waste, the strip is tapered at the end, preferably along two adjacent faces and this resultant weakening promotes the initial bending of the strip to form the coils.

Such a continuous series of coils are thus formed without using any mandrel or arbor and may be produced with great accuracy in their dimensions, by applying gagewheels to the opposite sides of the coils in the process of formation.

The apparatus is provided with means for holding the half die removably and for adjusting it at the desired angle to the path of the strip.

These and other features, objects and advantages of the invention will appear from a consideration of the following specification and accompanying drawings. The principal features of the drawing are diagrammatic in character, as they are designed only to illustrate the essential mechanical elements.

The invention will be understood by reference to the annexed drawing, in which Fig. 1 is a plan of the means for coiling the strip, showing the strip and one roll formed therefrom. The coiling-die is broken away at its operative face where it is shown in section at the horizontal center of the rolls; Fig. 2 is an elevation of the same parts; Fig. 3 shows the die and strip just after the commencement of the coiling operation; Fig. 4 is a plan of the tapering end of the flat strip adapted for coiling automatically; and Fig. 5 is an edge view of the same.

Fig. 3 shows the relation of the strip to the grooved die during the coiling operation, the strip being presented at an obtuse angle to the die and substantially tangentially to the cylindrical surface, thus producing a bending of the strip in two directions at its tapered point, that is, upwardly to make a coil and laterally to make the spiral.

Figure 3:
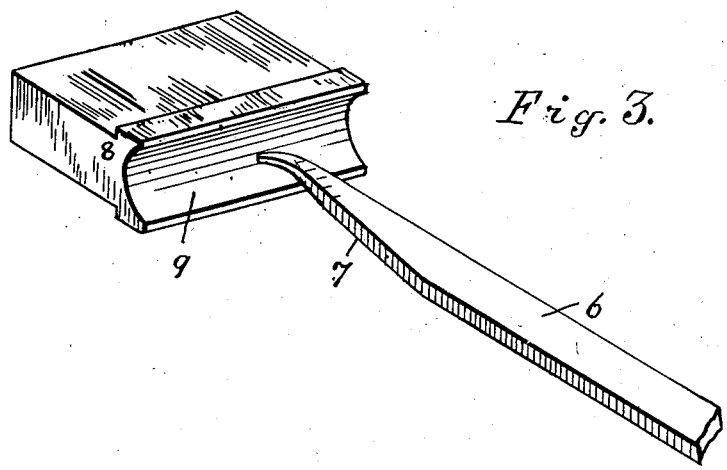
Fig. 3 shows the grooved die 8 as a rectangular block of metal with a substantially semicylindrical surface or groove 9 extending along one side.
Figure 4:
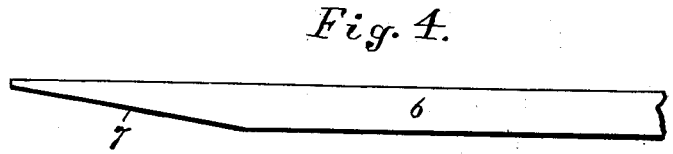
Fig. 4 shows the forward end of the strip 6 with a long taper 7 upon one edge, equal to two or three times the breadth of the strip, which taper disposes the strip to readily bend edgewise.
Figure 5:
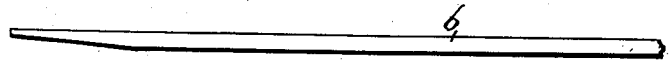
As shown in Figure 5 there is a shorter taper on the adjacent wider face of the strip to facilitate bending the end of the strip upwardly.

Strips of any length may be thus bent into a continuous series of coils, forming a roll whose shell is equal in thickness to the thickness of the strip, and the breadth of each coil is equal to the width of the strip.

A dotted line 11 is shown in Fig. 1 extended across the initial coil formed by bending the tapering end of the strip, the metal beyond such dotted line being cut off as useless.

The die 8 is shown with a reduced shank which is fitted between clamping-jaws 12 and 13 carried by a holder 14. The holder is mounted upon a bracket-piece 15 which would be suitably supported upon the frame of the apparatus.

In practice dies having grooves of different radius would be provided with shanks similar to that upon the die 8, so as to be held interchangeably by the jaws 12 and 13 to coil rolls of diverse diameter A pair of gage-wheels 16 and 17 is shown disposed above and below the coils 18 as they are shaped by the dies. The obtuse angle of the die-groove to the strip 6 may be varied by mounting the holder 14 adjustably upon the bracket 15.

Such a mounting is shown in Figs. 1 and 2, where the holder is formed with bolts 22 in a curved slot 21 having its center of curvature at that part of the die which is first engaged by the point of the strip, thus permitting the varying of the angle as desired to compensate for different dies and different widths of strips.

The gage-wheels would be in practice mounted in adjustable bearing so as to press upon the coils as they are formed, and size them by the pressure employed.

A pair of feed-rolls 19 is shown applied to the flat sides of the strip, and forces it through guides 20 into one edge of the groove in the die 8. Such feed-rolls are rotated at the desired speed and project the strip from the guideway substantially tangentially into the grooved die with sufficient force to bend the coils and form a continuous series thereof, which may be cut up into cylindrical rolls of any desired length. With the present invention, the strip is automatically wound from the beginning and no hand operated mandrel or the like is required to form the initial coils. Although the invention has been referred to, by way of example, as one for winding bearing rolls, it is to be understood that, in its broader aspects, the invention is not necessarily limited to the making of coils for any particular purpose.

Having thus set forth the nature of the invention what is claimed herein is:

1. The process of forming a hollow roll from a strip of material, which consists in tapering the end of the strip to weaken it, presenting said end of the strip against a concave surface set at an angle to the strip, and feeding the strip endwise against said surface to cause it to coil automatically into a smooth roll.

2. The method of coiling a flat strip having parallel edges and indefinite length into a smooth cylindrical roll, which consists in tapering the strip to a blunt point at one end, forcing such tapered end against a concave semi-cylindical surface sloped at an obtuse angle to the edges of the strip, thereby bending the strip in two directions as it forms each of the successive coils and forming a continuous cylinder of the said coils.

3. The process of forming a hollow roll from a strip of material which consists in tapering the end of the strip to weaken it, presenting said end of the strip substantially tangentially against a concave cylindrical surface set at an angle to the strip, and feeding the strip endwise against said surface to cause it to coil automatically into a smooth roll.

4. The process of forming a hollow roll from a strip of material of rectangular cross section which consists in tapering the end of the strip on two adjacent faces, to weaken it for bending in two directions, presenting the said end of the strip against a concave surface set at an obtuse angle to the strip, and forcing the strip endwise against said surface to cause it to coil into a smooth cylindrical roll.

5. The process of forming a hollow roll from a strip of material, which consists in presenting the end of the strip against a concave surface set at an angle to the strip, feeding the strip endwise against said surface to cause it to coil, and maintaining the diameter of said coil by rolling it on opposite sides.

6. The process of forming a smooth roll from a strip of material which consists in tapering the end of the strip to weaken it for the formation of an initial coil, and forcing the strip endwise against a concave surface to cause the strip to coil into a smooth roll.

7. An apparatus for forming cylindrical rolls from a flat strip having parallel edges, which consists of means for feeding the strip longitudinally, a half-round grooved die set at an obtuse angle to the edge of the strip, whereby the strip is forced continuously against the semi-cylindrical surface of the grooved die and formed into a continuous cylinder, and means for rolling the outer surfaces of the cylinder while in contact with the die.

8. An apparatus constructed according to claim 7, and having means for adjusting the grooved die to various angles with the feeding means in forming rolls of various sizes.

9. In apparatus for making rolls, a die having a smooth concave surface, means for forcing a strip of material endwise against said surface to cause the strip to bend into a smooth roll, and gage rollers engaging the opposite sides of the roll as it is formed to determine the size of the roll.

10. In apparatus for forming smooth cylindrical rolls from a strip of material, means for feeding the strip longitudinally, means for holding dies of different sizes at an angle to the path of feeding movement of the strip, and means for varying said angle in accordance with the size of the die in use.

11. In apparatus for forming rolls from a strip of material, means for feeding the strip longitudinally, means for holding a die at an angle to the path of the strip, and means for adjusting said die in an arc the center of which lies at the point of contact of the die with the end of the strip being fed.

In testimony whereof I have hereunto set my hand.

CONRAD KNOTH.